March 28, 1939. W. B. MITCHELL 2,151,864
MACHINE FOR THE MANUFACTURE OF GLASS BOTTLES
Filed Nov. 20, 1935 4 Sheets-Sheet 1

March 28, 1939. W. B. MITCHELL 2,151,864
MACHINE FOR THE MANUFACTURE OF GLASS BOTTLES
Filed Nov. 20, 1935  4 Sheets-Sheet 3

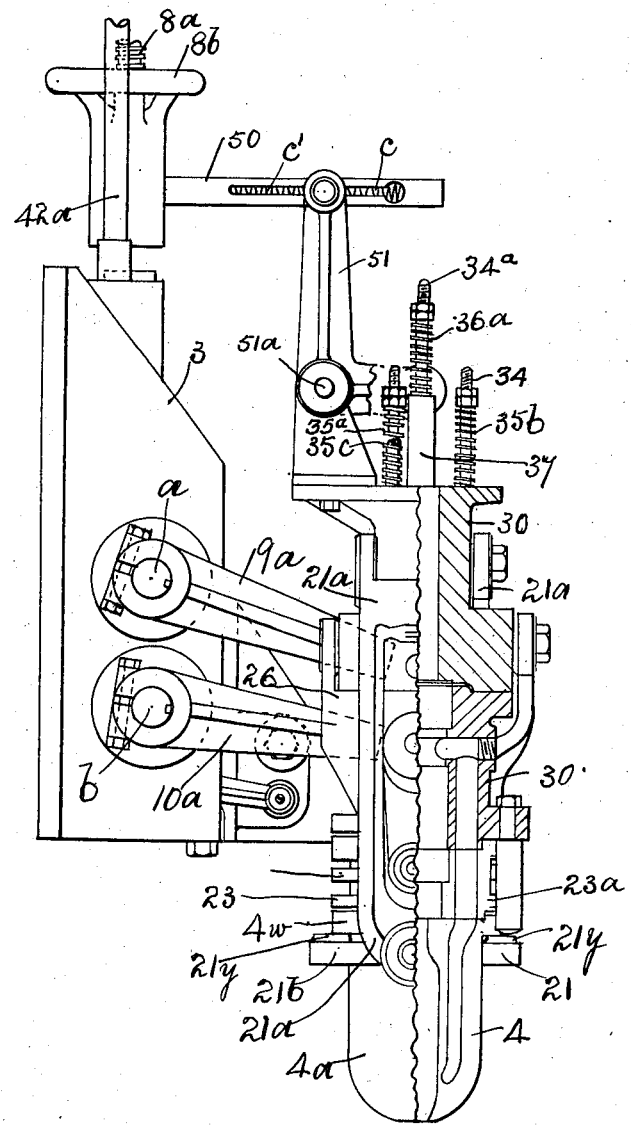

Patented Mar. 28, 1939

2,151,864

UNITED STATES PATENT OFFICE 2,151,864

MACHINE FOR THE MANUFACTURE OF GLASS BOTTLES

William Bell Mitchell, Cross Banks, Shipley, England

Application November 20, 1935, Serial No. 50,652
In Great Britain November 30, 1934

4 Claims. (Cl. 49—5)

This invention relates to machines for use in the manufacture of glass bottles, said machines being of the type known as suction machines; and my present invention has for its object the production of the operating members which are essential for giving the desired shape to the resultant bottle that the efficiency thereof is greatly enhanced. This object I secure by making use of the joint-forming surfaces of the moulds that are to fit against each other, so that each pair of said contacting and co-acting surfaces, when being brought into position, are permitted such freedom of relative movement as will enable them to assume their said positions while yet securing the distribution of the pressure exerted upon them more effectively than heretofore. The said freedom of action, however, is so controlled that the moulds' operating members are finally brought into positions for effectively locking and retaining said moulds during the suction of the molten glass and the moulding of same therein, that leakage is effectively prevented and the deterioration of the said co-acting surfaces is more certainly prevented.

In order that my said invention may be readily understood I have hereunto appended sheets of drawings showing sufficient of the general arrangement of the machine with my improved devices or mechanism mounted thereon, in which:

Fig. 4 is an elevation of the parts shown by Fig. 3 and as seen in the opposite direction, and with certain of the devices therein shown in elevation, while others of the devices are shown in sections.

Fig. 5 is a sectional view showing a part of the parison-mould with its supporting and operating devices in detail as is hereinafter described.

Fig. 6 is a plan showing the formation of the spanning members for supporting the two semi-circular portions of the neck-ring.

Fig. 7 is a sectional view showing the yielding spring devices for certain of the ball and socket joints hereinafter explained.

Fig. 8 is a part sectional elevation showing the valves controlling the admission of air to and the withdrawal of air from the moulds.

Figure 1:
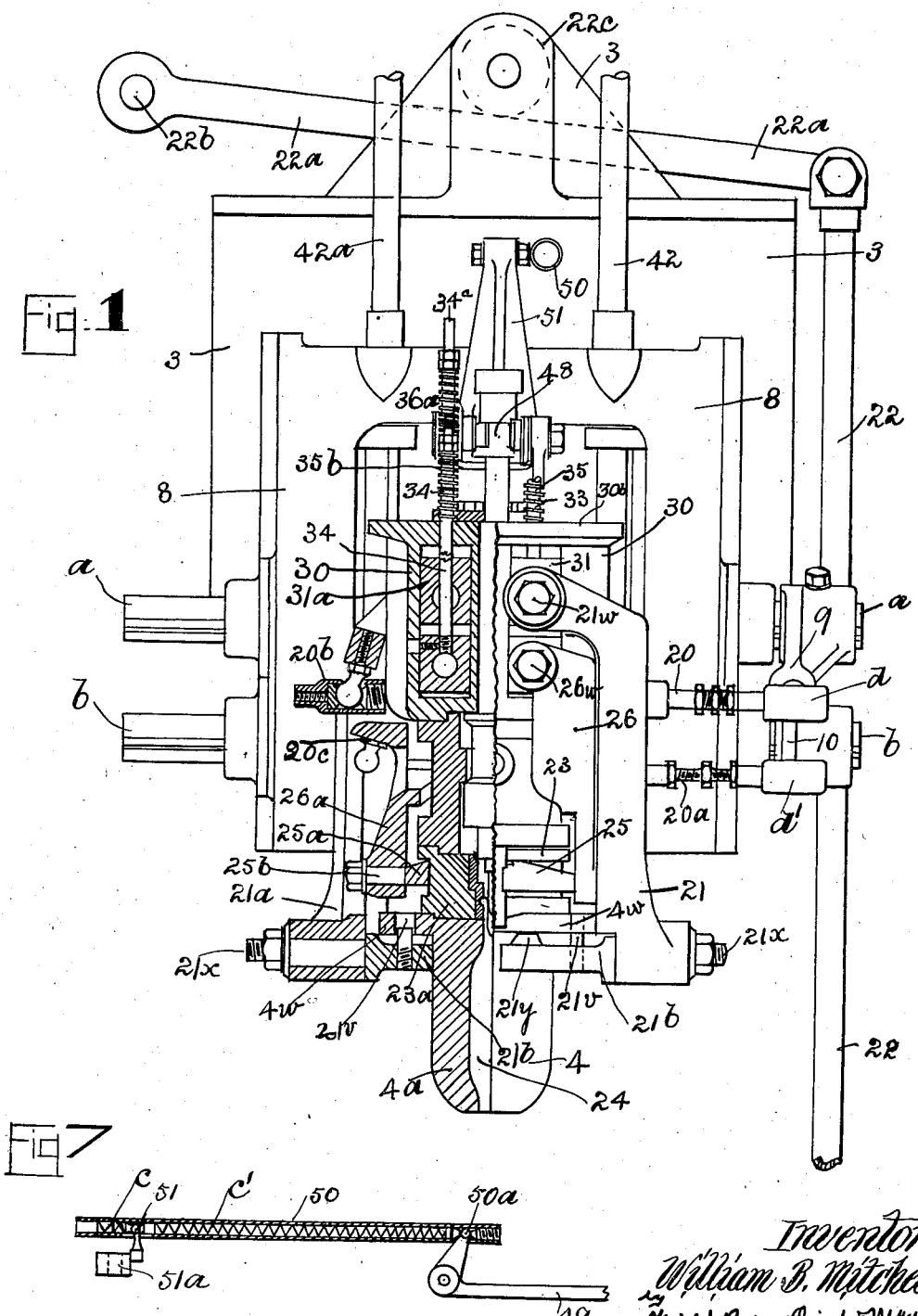
Fig. 1 is a front elevation of the parison mould and its operating mechanism. The portion to the right of the figure being shown in elevation, while the other portion is shown in section with the sections of parison-moulds shown in their closed positions.

In the production of the parts of the machine to which my novel features are to be applied I make use of the usual rotary base member 2 upon which the various fittings and moving parts (as well as the vertically sliding head portions 3 for carrying the parison-mould sections 4, 4a and their operating mechanisms) are constructed, mounted and arranged, as is hereinafter fully described.

The central or base member 2 is of a shape and formation that enables the mounting thereon of a plurality of pillars 5 which have secured upon their upper ends a connecting member 6 of annular shape in order that said pillars 5 may be fixed firmly in each of their respective and relative positions, while other bearings are mounted upon said pillars 5 and annular member 6 to support the guiding slides 5a over which the sliding members 3 travel.

The rotary member 2 is supported in the usual manner by the extending parts 2a fixed thereon reaching down to have an appropriate ball race secured thereto to rest upon antifriction balls carried by the base member 7 of the machine in well known manner, while appropriate bevel or like gearing is employed for transmitting motion to said rotary member operated by any suitable driving gear deriving its motion from any appropriate source of power.

The supporting member 8, upon which the operating levers 9, 10 and 9a, 10a are pivoted, is adjustably mounted to slide over the sliding member 3 so that by operating its adjusting screw 8a, by the screwed hand-wheel 8b, said member 8 may be secured upon the member 3 in order to slide with said member 3 with the parison mould sections 4, 4a which it carries at a greater or less distance from the finishing mould 11. This adjustable mounting of the member 8 enables it to be fixed at the desired distance from and above the finishing mould 11 as the length or depth of the bottle to be produced thereby necessitates.

Figure 3:
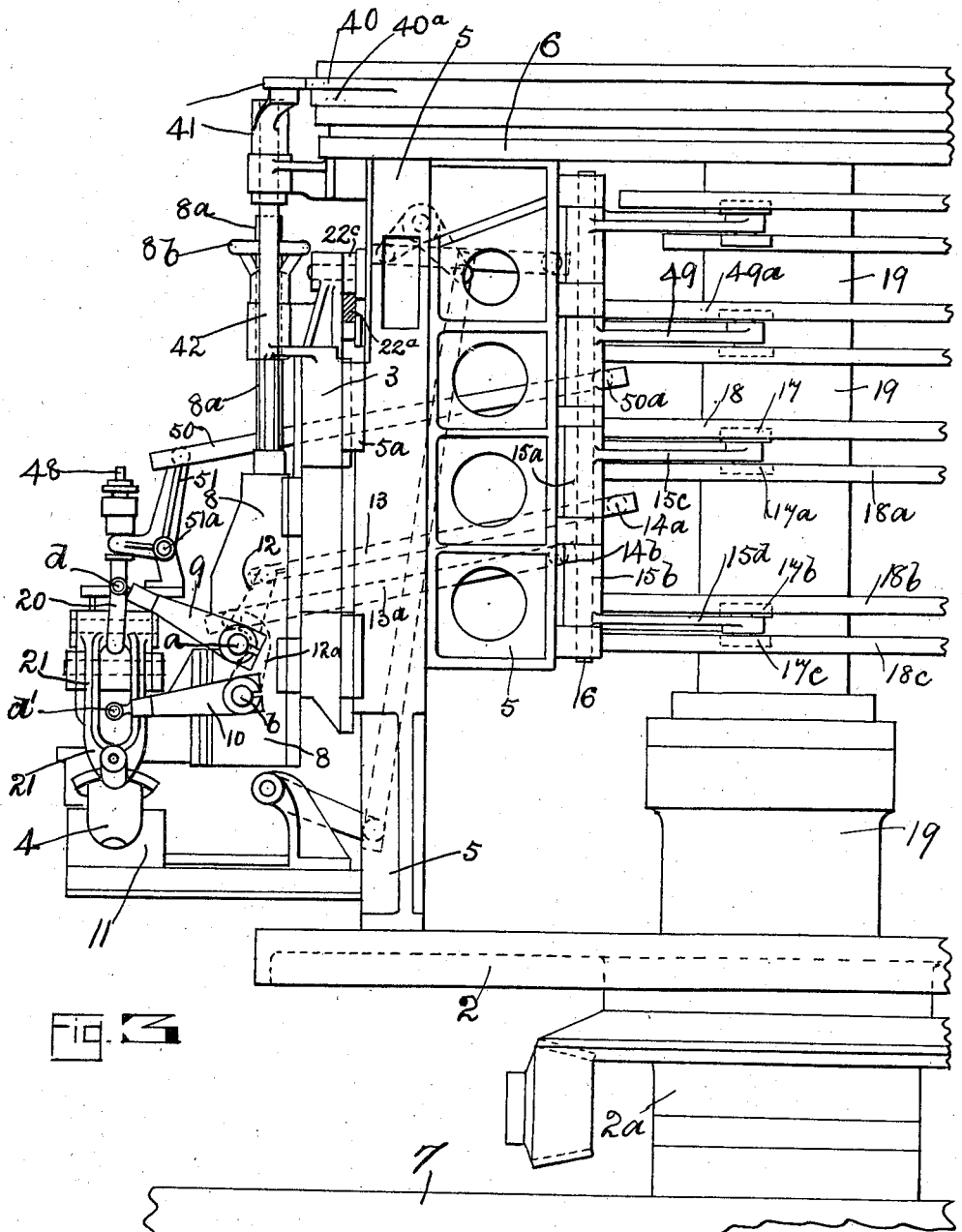
Fig. 3 is a side elevation of the parts shown by Fig. 1 as seen from right to left of said figure.

The levers 9 and 9a are mounted on a horizontal rock shaft a. The levers 10 and 10a are mounted on a horizontal rock shaft b. Both of these shafts are permitted a slight longitudinal movement for a purpose hereinafter explained. Rocking movement is imparted thereto by respective levers 12 and 12a which, in turn, are actuated by connecting rods 13 and 13a. These rods are connected by ball and socket joints 14a and 14b at their opposite ends to hubs 15a and 15b, respectively, which loosely swivel on their supporting shaft 16. As appears in Figure 3, this connecting mechanism between the levers 9, 9a, 10 and 10a and the hubs 15a and 15b permits vertical movement of the sliding bearing 8, in which the rock shafts a and b are journalled, without disturbing the operative relation between the levers 9, 9a, 10 and 10a and the hubs 15a and 15b.

The hubs 15a and 15b have extending horizontally and respectively from them arms 15c and 15d which, by bowls or runners 17, 17a and 17b, 17c coming in contact with their respective cams 18, 18a, 18b and 18c (as they are carried around in their circular paths by the rotary table, its pillars 5 and the annular member 6 in well known manner) will be oscillated to move the levers 9, 9a, 10 and 10a by reason of the operating cams 18, 18a, 18b and 18c being fixed upon a central supporting member 19.

It will be observed that the movements of the ball members in the ball and socket joints 14a and 14b, operated by the levers 15c and 15d, are carried out in the horizontal plane, while the other ends of the connecting rods 13 and 13a move in the arc of a circle in such a curved path that certain twisting actions might be set up at the jointing parts of the levers 13, 13a with their respective levers 12 and 12a. To compensate for such slight irregularities the connecting ball-and-socket joints between the levers 12 and 12a and their connecting rods 13 and 13a have a yielding spring at c and $c^1$ (Fig. 7) so that any strain that the irregularity in the relative movements of the rods and their levers may set up, is compensated for by said springs.

Figure 2:
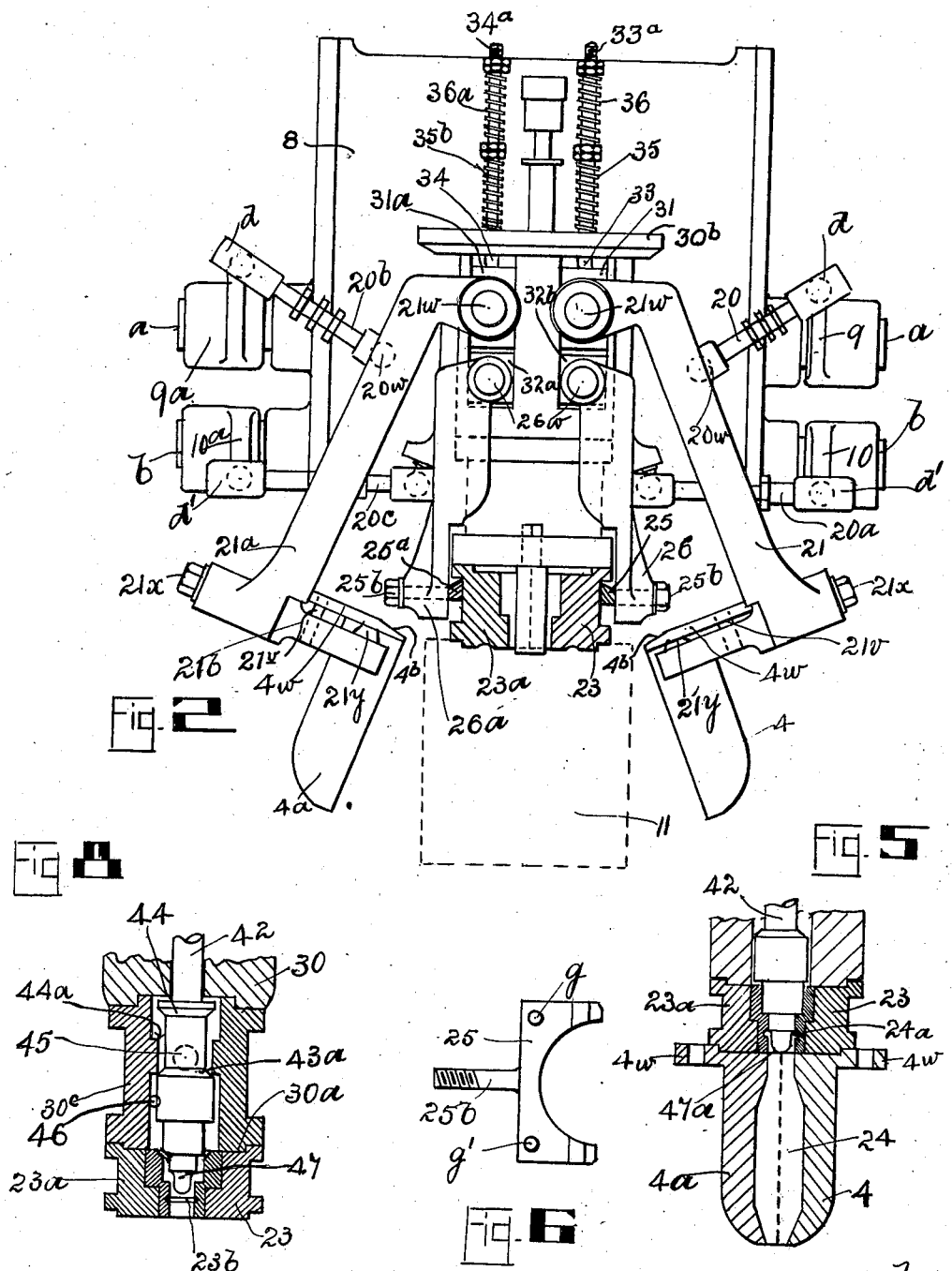
Fig. 2 is also a front elevation of certain of the parts shown by Fig. 1 but with the parison moulds and their operating devices occupying positions where said parison moulds are separated or moved apart.

The outer ends of the levers 9, 9a, 10, 10a are connected by ball and socket joints d, $d^1$ to the outer ends of the thrust levers or connecting rods 20, 20a, 20b and 20c, and when the levers 15c and 15d have reached the desired position on their operating cams 18, 18a and 18b, 18c the levers 9 and 9a are raised so that the connecting rods 20 and 20b will also be raised to move the levers 21 and 21a laterally as shown by Fig. 2; thus each of said levers will carry with it its respective mould section 4, 4a so that the two become separated or moved apart from each other as shown by Fig. 2 for the purpose hereinafter described.

After the parison-mould sections have assumed the positions stated, as shown by Fig. 2, the cam mechanism which is situated at the fixed base of the machine will operate a lever (of well known use and formation) which is coupled to the lower end of the connecting rod 22 (Figure 1) so that said connecting rod will be lowered in order to carry with it the lever 22a which is pivoted at 22b, to allow the runner 22c which rests thereon to descend, and since said runner 22c is pivoted upon its stud fixed to an upper extension of the sliding member 3, said sliding member 3 will also descend, and on such descent it will lower the glass parison that has been previously moulded by the mould 4, 4a (and which at such time is being held suspended by the semi-circular neck ring 23, 23a) into the finishing mould 11.

The suspending of the glass parison 24 by the neck-ring 23, 23a, is secured or effected by the glass which has been filled into the parison mould 4, 4a extending above said mould to enable a flange 24a to be formed on said parison glass by said glass entering an annular groove 23b formed in each of the semi-circular neck-ring sections 23, 23a as shown by Fig. 5.

When the molten glass enters the neck-ring 23, 23a to form the flange 24a on the glass parison 24, it also has an indent 47a formed centrally in it to enable the "blowing" actions thereon when the bottle is being formed in the finishing mould in manner well known.

The two ring sections 23, 23a are supported by semi-circular spanning members 25 and 25a which are provided with pins g, $g^1$ that enter retaining holes on the two sides of each of the members 23, 23a as shown by Fig. 6.

The supporting spanning members 25 and 25a have each an extending pivotal spindle 25b which passes through the outer end of the arm of its respective lever 26 or 26a in order to swivel thereon.

The connecting rods or levers 20 and 20b are actuated by the levers 9 and 9a respectively, while the opposite ends of the connecting rods 20 and 20b to those which are connected to the levers 9 and 9a are respectively connected by ball and socket joints 20w to their levers 21 and 21a. By these means when the levers 9 and 9a are raised into the position shown by Fig. 2 the connecting rods 20 and 20b will also be raised and therefore will oscillate the levers 21, 21a about their pivotal supporting studs 21w.

When the levers 10 and 10a are raised the connecting rods 20a and 20c (which are connected to them as is hereinbefore described) are also raised, and these rods 20a and 20c are connected by ball and socket joints to their respective levers 26 and 26a that are pivoted on their studs or shafts 26w.

The connecting of the parison mould sections 4, 4a to their supporting and operating levers 21 and 21a is carried out by having said parison moulds formed each with a radial flange 4w, which flange is supported by a spanning member 21b in each case, and this spanning member 21b has a spindle or shank 21x (in each case) formed upon it, so that said spindle or shank may swivel on the lower end of the lever 21, while on the upper surface of the bifurcated supports 21b a rib or supporting projection 21y is formed in order that same may take beneath the annular flange 4w to allow said flange to oscillate thereon with limitations to its movement, and the said flange 4w in each case has also an opening made upon it to span or take over a retaining pin 21v also fixed in the member 21b. Thus the retaining pins 21v will secure the parison mould sections 4a against sliding away from or leaving their supporting members, while yet allowing said mould sections to swivel.

By arranging the parison mould sections 4, 4a to be supported in the manner described, when they are removed from their operating positions certain freedom of motion is permitted to them and certain looseness of fitting is also permitted in order that should any irregularities occur through varying temperatures of said parison mould sections and their operating members, when the levers 9 and 9a are caused to descend in order to force the connecting rods 20 and 20b firmly against the levers 21 and 21a the fitting surfaces of the mould sections 4, 4a are brought firmly against each other and there held or locked, and in such conditions and under such circumstances that a perfect joint is formed between them, the one fitting snugly against the other. These locked positions of the mould sections 4 and 4a are not interfered with or prevented from being arrived at by any springing or other undesirable actions on the part of the operating levers and jointing members, since I include these operating levers and joining members with the rock shafts $a$ and $b$ in mechanisms which have floating action due to the longitudinal play in the shafts.

The bearings 30 for the operating shafts 21w, 26w which support the sets of levers 21, 21a and 26, 26a are bolted or fixed upon the sliding head 8 and are made to extend from their lower surface at 30a (being in contract with the neck mould) to the upper surface 30b which is in contact with the springs and supporting members hereinafter described.

The lower part 30c of the bearing member 30 is bolted or fixed to said bearings 30 in order to form the complete bearing as shown by the drawings.

Within slots in the upper end of said bearing 30 are mounted sliding blocks 31, 31a and 32b, 32a and these blocks are operated by their connecting rods 33, 33a and 34, 34a which have their upper ends arranged with adjustable lock nuts to press upon supporting springs 35, 35a, 35b, 35c and 36, 36a.

The springs 35 to 35c are each arranged to rest upon the upper end of the member 30, while the springs 36, 36a are arranged to rest upon a tube or sleeve 37 which has its lower end also resting upon the member 30.

By the arrangement of the yielding springs and their connecting rods to have the lower ends fixed to (as shown by the drawings) the blocks 31, 31a and 32b, 32a, the said blocks will keep the levers 21, 21a and 26, 26a normally in their raised positions, and in such raised positions the members which are mounted upon said levers 21, 21a and 26 26a respectively will keep the upper surfaces of the two parts of the parison moulds 4 and 4a against the lower surface of the neck ring 23a with which they make such contact as to form an air-tight joint, and the formation of this air-tight joint is effected and at all times brought about by the actions of the said springs being allowed freely to exert their pressure. By the swivelling and rocking actions of the parison mould sections 4 and 4a, when they are brought into their operating positions to pass underneath the neck ring the inclined edge 4b upon each of said mould sections 4 and 4a will take under the outer edge of the flange on the neck ring by reason of said inclined surfaces first being forced under the edge of the flange and finally brought into perfect alignment with same at right angles to the contacting surfaces parallel to the axis of the neck ring where also the contacting surfaces of the two mould sections 4 and 4a will coact with each other to form a joint which is air-tight.

The opening up of the suction apparatus for exhausting air from the moulds and the opening-up of the blowing apparatus to the moulds is carried out by the cams 40 and 40a which operate two levers 41 (only one of such levers being shown on the drawings) and each of these levers operates its respective shaft 42 and 42a in well known manner, the valves also being arranged in the sliding member 8, also of well known arrangement. However, as controlling means for directing the actions of said operating valves I make use of a centrally situated double acting valve, one surface 43a of which closes the interior passages to the parison mould so that the pressure air can only enter the part below said valve surfaces 43a through the opening 46 which includes all the parts within the parison mould, the neck ring mould and the finishing mould when such is in use, while on the same spindle another valve 44 is formed so that it may engage a seat 44a when the suction is in action.

By these means said valve limits the actions of the suction apparatus operating through the suction opening 45 so that all air is removed by way of it from the parison and other moulds, the neck ring mould and other cavities, at a time that said suction actions are being performed.

During the time that the suction valve 44 is placed upon the seating 44a the plug 47 on the end of the valve's spindle enters the neck ring to form an indentation 47a in the glass of the glass parison for well known purposes.

The valves 43a and 44 which are formed upon the spindle 48 (Figure 1) are so arranged that they may be actuated by one and the same set of cams 49 and 49a (Figure 3) which by ball and socket joints 50a actuate a rod 50 that is connected to the upper end of a lever 51, and in this manner said lever (which is pivoted at 51a) may raise and depress the rod 48 by its other arm as desired.

The operating levers for carrying out the varied movements of the parison moulds and other parts in connection with them, and the valves' operating elements, are arranged so that a plurality of said moulds and their accompanying mechanisms as stated may be arranged upon and around a rotary carriage or framework to revolve around a central pillar which is stationary. The framework, as it revolves, carries with it the several sets of levers and their runners into contact with their corresponding sets of cam surfaces which are fixed and stationary upon the central pillar, by which arrangement, since each set of said devices is complete for producing one glass bottle or article at each revolution, it is obvious that if four sets are used four bottles will be produced with each revolution as stated. Therefore the stationary cams are arranged to operate each set in its order as each co-acting set of the apparatus is presented thereto.

The actions of the apparatus hereinbefore described are as follows:

As each head is approaching the position near the furnace where the parison mould may descend to take up the molten glass the said moulds are operated by the cam actions to close the moulds and form air-tight joints by the levers 9, 9a and 10, 10a, connecting rods 20, 20a and 20b, 20c and other parts so moving said mould that they begin to approach each other from their open and raised positions shown by Fig. 2 (where said mould sections 4 and 4a are loosely held by their supporting members 21b) while the neck ring sections 23, 23a are also supported loosely by the members 25 and 25a.

In each case the supporting rib portion 21y on the swivelling supporting member 21b and a similar formation on the upper surfaces of the supporting or spanning members 25 and 25a (both of which swivel upon their axial pin 25b) are so shaped for contact with the flanges on the moulds that said members are held comparatively loosely until they contact with each other when in the position shown by Fig. 1, and when approaching such position the inclined surfaces 4b on the upper ends of the flanges 4w of the parison mould sections 4, 4a will contact with the lower surfaces of the neck ring mould sections where they are retained by the actions of their springs 35, 35a, 35b and 35c and 36, 36a to form air-tight joints as required and as assisted by the actions of said springs.

When the moulding members occupy their locked positions as stated the forces exerted upon them by the rods or levers 20 and 20b are withstood by the levers 9 and 9a and the cross shaft a upon which they are fixed. In like manner the locking in position of the neck ring sections 23, 23a is effected by the levers 10, 10a and their connecting rods 20a and 20c respectively assuming similar horizontal positions and alignment so that the dead centre locking action is again secured for said devices.

By the moulding and other members being locked together and rigidly held by the solid unyielding dead-centre positions of their rods and levers, although a slight sliding movement of the supporting shafts a and b upon their bearings is permitted, yet by all the parts moving as one element, all the rigidity of their actions is maintained by said devices acting as one solid mass.

Continuing the sequence of actions of the machine, when the mould 4, 4a has dipped into the molten glass in the furnace, by cam action the suction apparatus of well known type and in well known manner is caused to withdraw all the air from the mould 4, 4a, thereby causing the glass to flow into the mould 4, 4a in well known manner. By said flowing the molten glass ascends into a cavity in the lower end of the neck ring mould sections 23, 23a during which the head is continuing its rotary movement until its operating cams cause it to rise out of the molten glass, and on such rising it moves past cutting members which carry out the cutting actions so that the portion of glass which extends from the mould is cut off to fall into the furnace while the mould continues its movement forward.

According to my arrangement of devices I prefer having the known form of cut-off members carried with and arranged to effect their cutting actions with each of their respective moulds in manner described.

During the continued rotary movements of the moulds, after the excess portion of glass has been cut off they reach a position where the parison moulds are separated from each other by their operating cams, levers and rods, and the moulded glass parison is then caused to descend in well known manner to be received by the finishing moulds which may be of well known formation and arrangement and therefore are not herein shown and described.

During the remaining advancing motions of the head the compressed air is admitted through the usual cam actuated mechanism and valve devices so that the bottle is then blown and carried forward to be discharged after the neck ring and the finishing moulds have performed their respective functions.

Such being the nature and object of my said invention, what I claim is:

1. In a machine for manufacturing glass bottles, a vertically slidable head, a parison mold having separable parts, and floating means for pressing said parts tightly together to close the mold, said means comprising a horizontal rock shaft mounted on said head for limited axial movement, and mechanism actuated by rocking movement of said shaft to move said mold parts together to close the mold, said mold and mechanism being horizontally movable as a unit with said shaft relatively to said head so as to be self-centering with respect thereto.

2. In a machine for manufacturing glass bottles, a vertically movable head, a parison mold having two separable parts supported by said head, means for pressing said parts together to close the mold, said mold and closing means being horizontally movable as a unit a limited distance whereby the mold is self-centering with respect to the head, a neck-ring supported by said head above said mold and having two separable parts, and means for pressing said neck-ring parts together, said neck-ring and last-named means being horizontally movable as a unit a limited distance whereby the neck-ring is self-centering with respect to the head.

3. In a machine for manufacturing glass bottles, a parison mold having relatively movable parts, and means for moving said parts together to close the mold, said means comprising a rockshaft, means for supporting said shaft so that it is capable of limited axial movement, a pair of spaced levers mounted on said shaft to rock therewith, said levers being on opposite sides of said mold, a pair of thrust rods pivoted at one end to said levers respectively to form a pair of toggle devices therewith, and means engaged by the other ends of said thrust rods to press the mold parts together when said shaft is rocked in one direction and to separate said parts when the shaft is rocked in the other direction.

4. In a machine for manufacturing glass bottles, a parison mold having two separable parts, and means for moving said mold parts toward and from each other, said means comprising a pair of bearing blocks above said mold, resilient means supporting said blocks so as to permit downward yielding of said blocks, a pair of rocking levers journaled in said blocks respectively and rockable therein so as to move said mold parts together, a pair of thrust rods pivotally attached at one end to said levers, said rods being aligned when the mold is closed, a rockshaft parallel to said aligned rods, and a pair of spaced levers fixed on said shaft and pivotally connected respectively to the other ends of said rods, said shaft being mounted for limited axial movement.

WILLIAM BELL MITCHELL.